United States Patent [19]
East

[11] Patent Number: 5,642,800
[45] Date of Patent: Jul. 1, 1997

[54] BELT CONVEYOR IDLER ROLL SEAL

[75] Inventor: Charles F. East, Van Vleet, Miss.

[73] Assignee: FMC Corporation, Chicago, Ill.

[21] Appl. No.: 611,359

[22] Filed: Mar. 5, 1996

[51] Int. Cl.[6] ................................. B65G 13/00
[52] U.S. Cl. ............................................ 193/37
[58] Field of Search ................................ 193/37

[56] References Cited

U.S. PATENT DOCUMENTS

| | | | |
|---|---|---|---|
| 2,169,625 | 8/1939 | Weiss et al. | 193/37 X |
| 3,610,387 | 10/1971 | Vom Stein | 193/37 |
| 4,664,243 | 5/1987 | Martin | 193/37 |
| 4,681,215 | 7/1987 | Martin | 193/37 X |
| 4,852,230 | 8/1989 | Yu | 193/37 X |
| 5,261,528 | 11/1993 | Bouchal | 193/37 X |
| 5,372,230 | 12/1994 | Niklewski | 193/37 |

FOREIGN PATENT DOCUMENTS

| | | | |
|---|---|---|---|
| 1187030 | 5/1985 | Canada | 193/37 |

OTHER PUBLICATIONS

Link–Belt Series Catalog. FMC Corporation., 1991.

*Primary Examiner*—James R. Bidwell
*Attorney, Agent, or Firm*—Michael C. Penn

[57] ABSTRACT

There is provided an idler roll for use in belt conveyor systems comprising a rotatable outer seal member disposed on at least one end of the idler roll, the outer seal member comprising at least one blade. There is also provided a seal assembly for use on an idler roll comprising a rotatable outer seal member, the outer seal member comprising a plurality of vanes. There is further provided a conveying system comprising a conveyor belt, and an idler roll, the idler roll comprising a rotatable outer seal member disposed on at least one end of the idler roll, the outer seal member having a plurality of blades, wherein the outer seal member is energized by the movement of the conveyor belt.

16 Claims, 7 Drawing Sheets

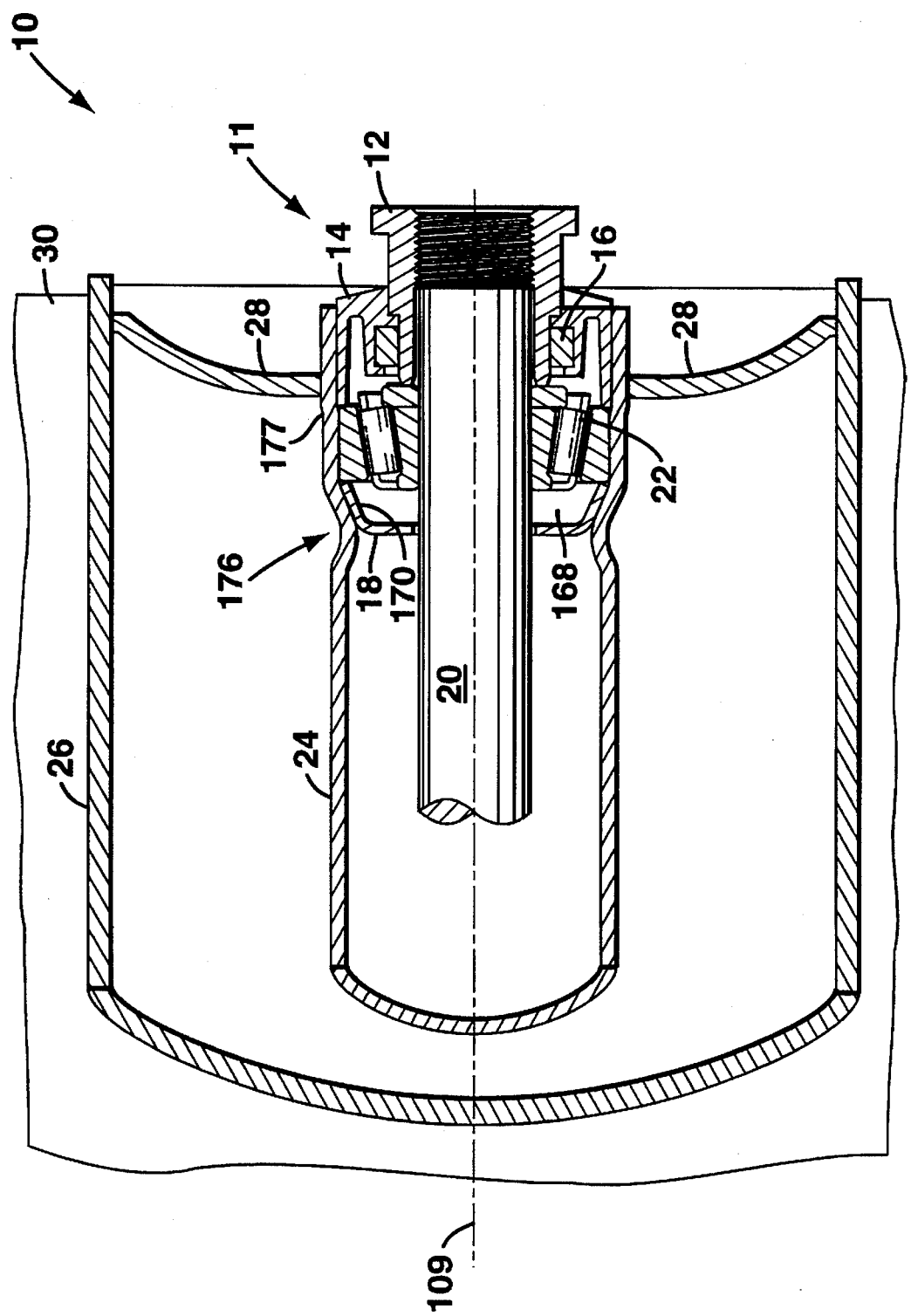
FIG_1

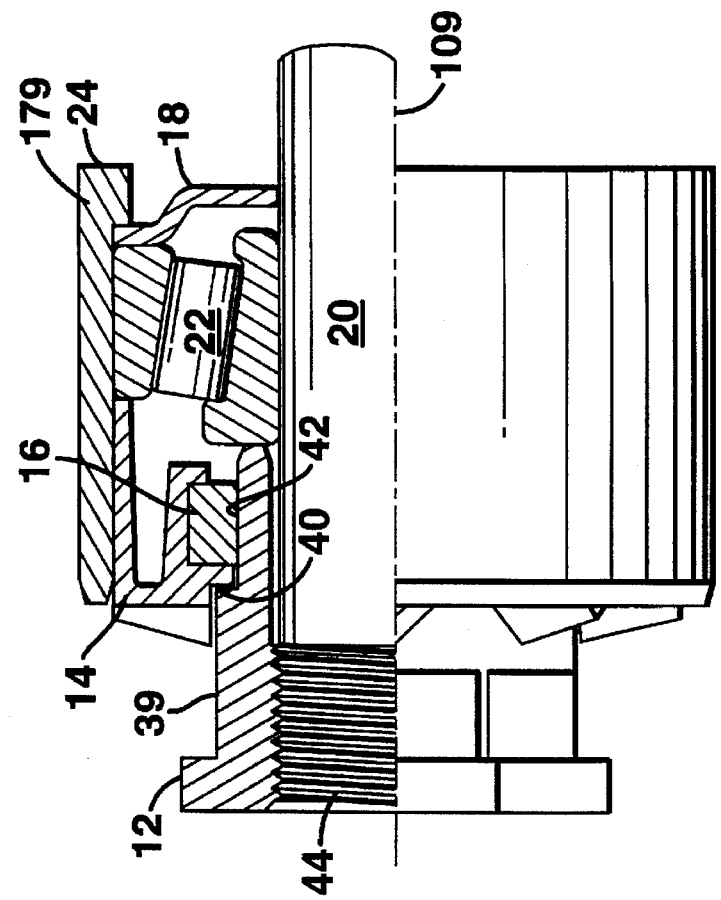
FIG_2B
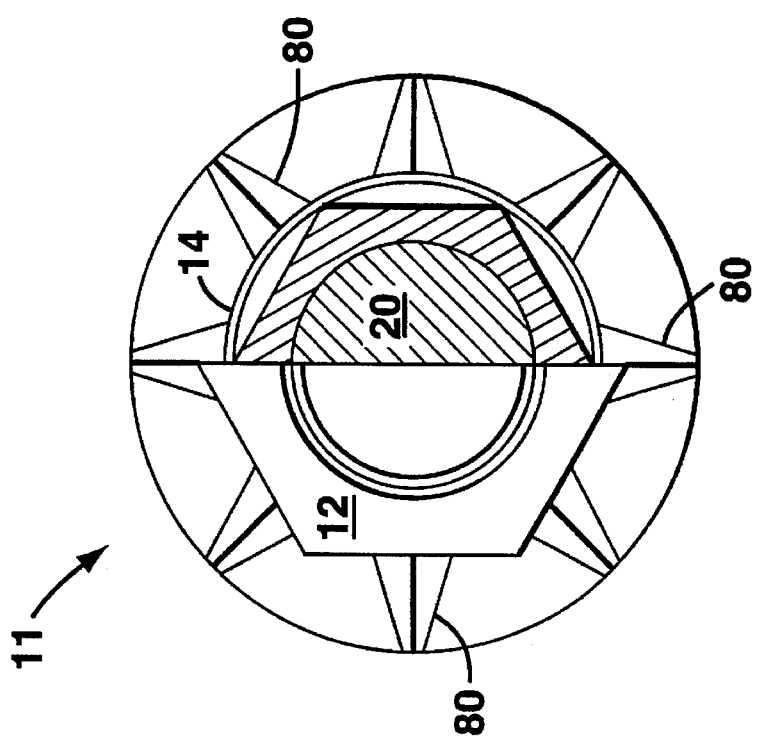
FIG_2A

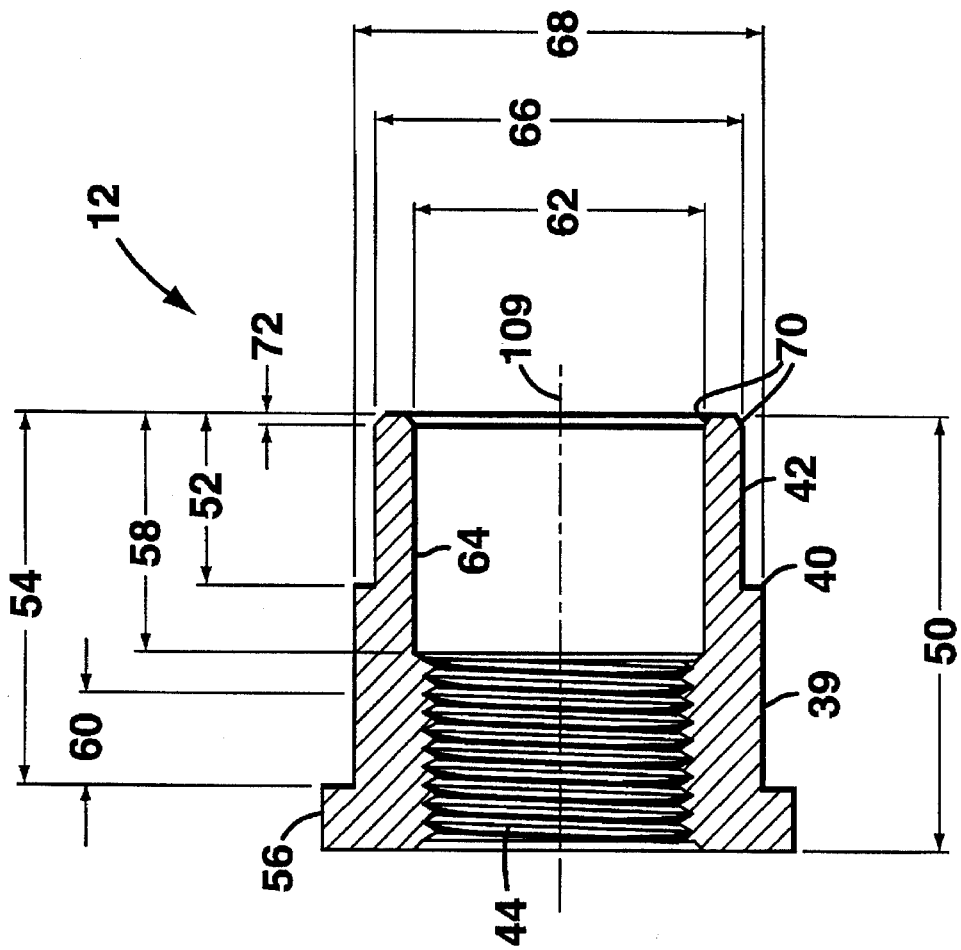
FIG_3B
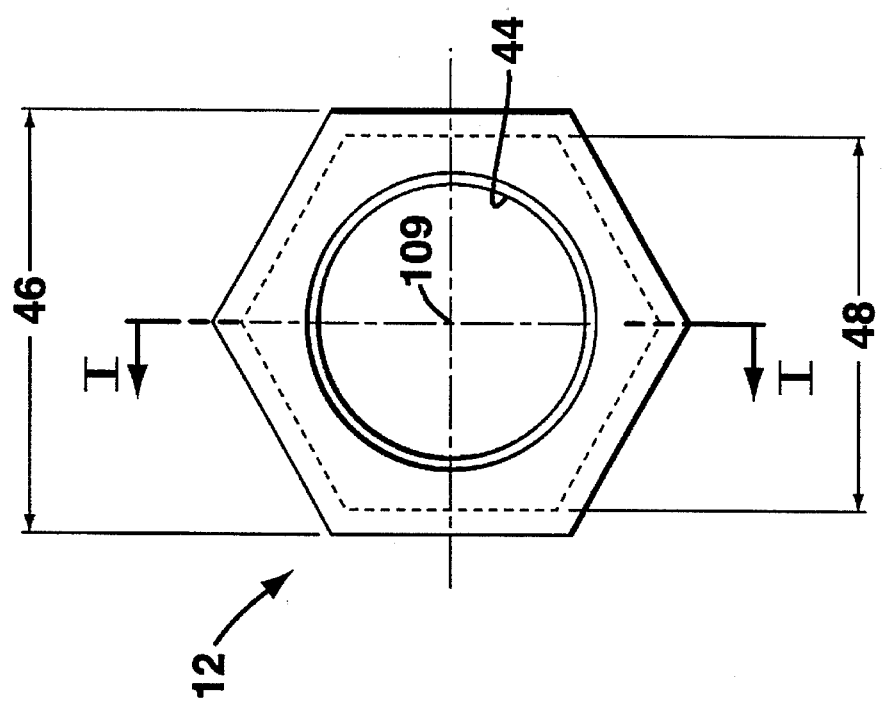
FIG_3A

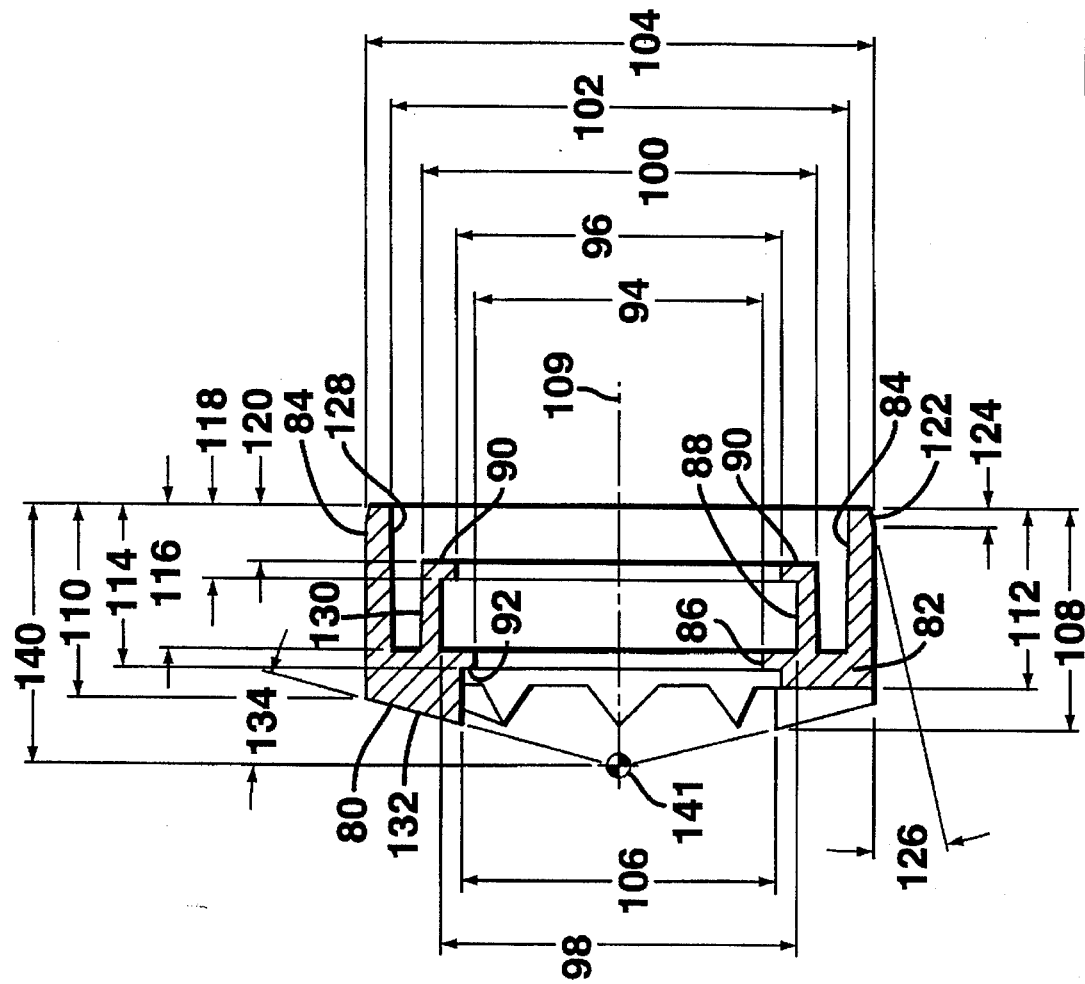
FIG_4B
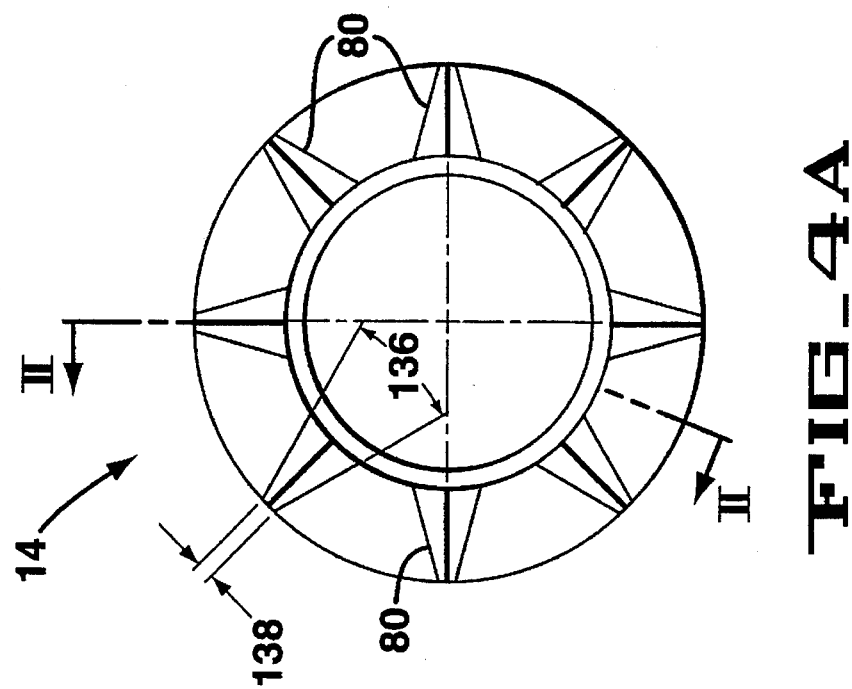
FIG_4A

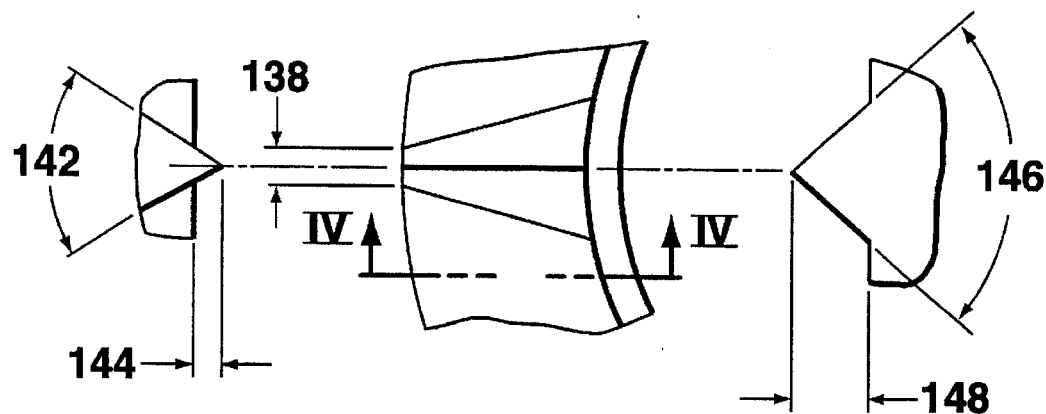
FIG_4C
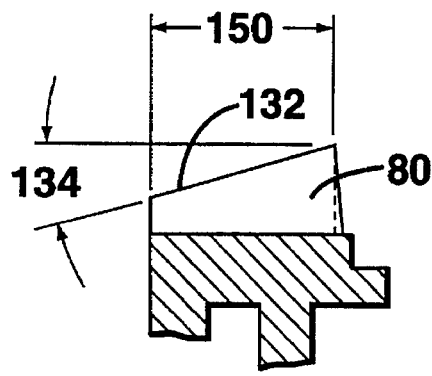
FIG_4D
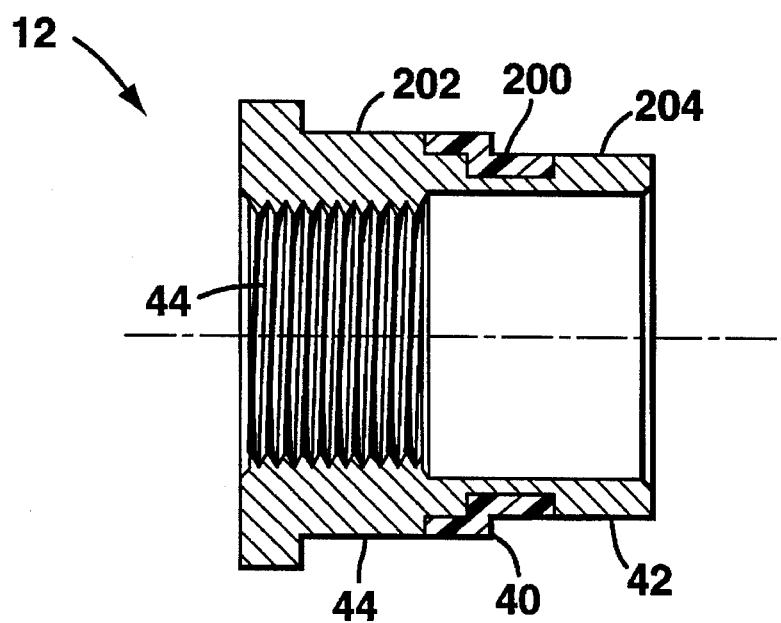
FIG_7

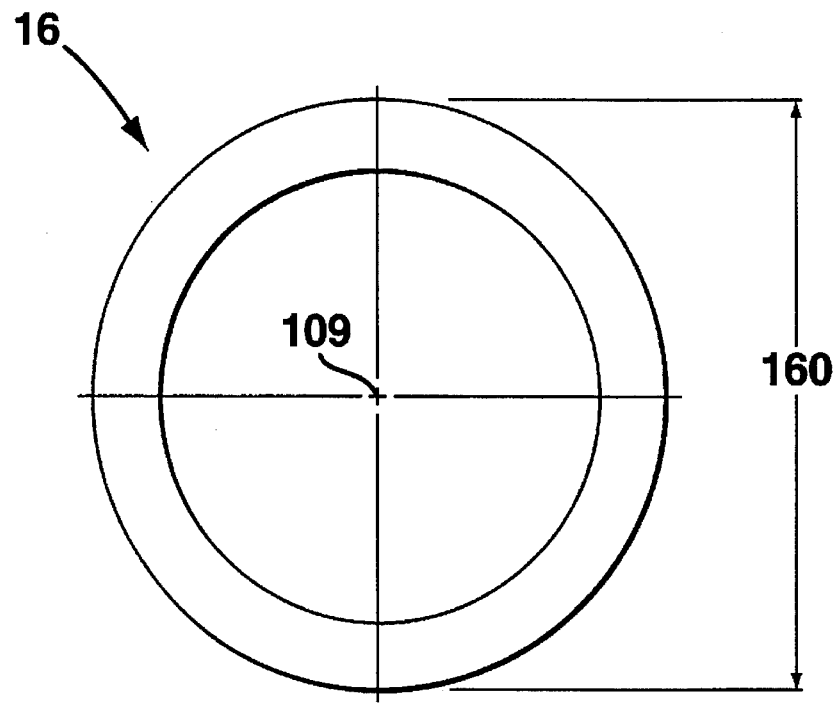
FIG_5A
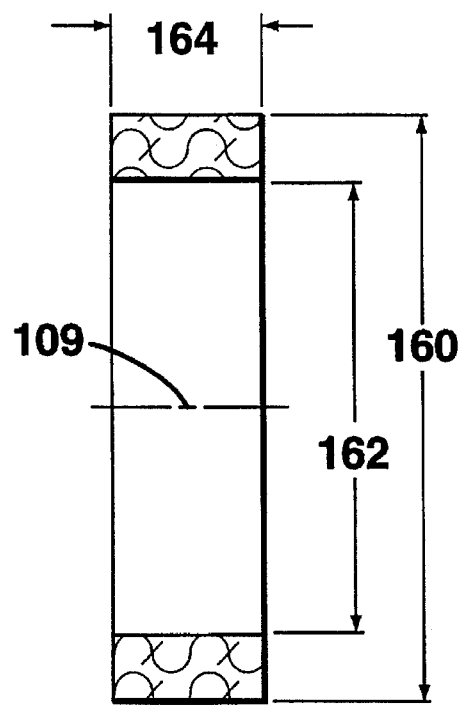
FIG_5B

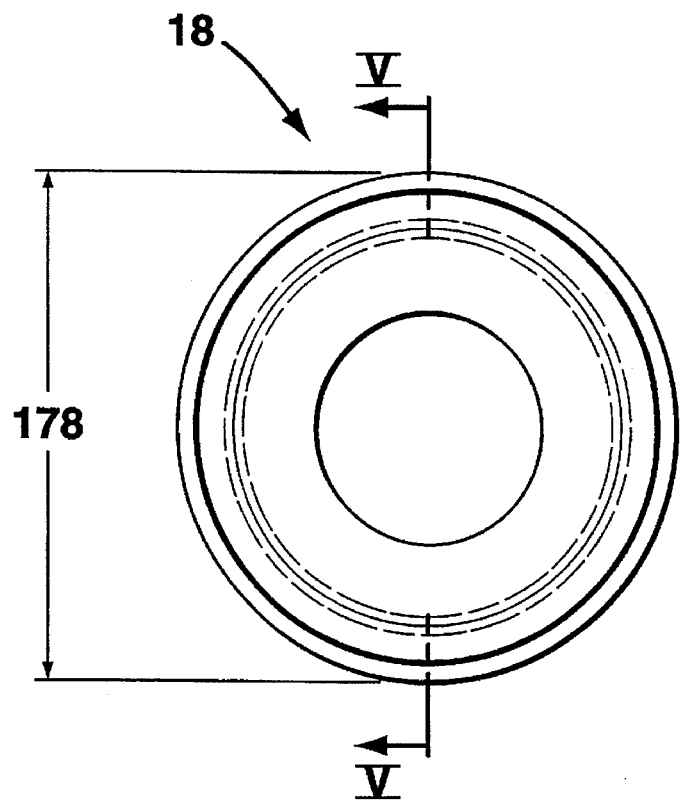
FIG_6A
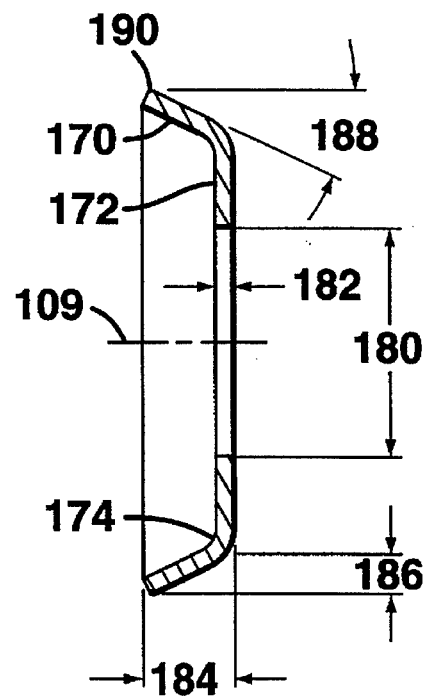
FIG_6B 5,642,800

BELT CONVEYOR IDLER ROLL SEAL

BACKGROUND OF THE INVENTION

1. Field of the Invention

This invention relates to idler rolls and more particularly to seals used on belt conveyor idler rolls.

2. Description of Related Art

Idler rolls are typically used in belt conveyor systems for handling bulk material, such as coal, sand, widgets, and the like. However, idler rolls may be subject to premature roller failure. One cause of idler roll failure is encountered because of bearing failure. Bearing failure in many cases can be attributed to the idler roll seal permitting contaminates to enter into the bearing elements. Therefore, it is desired to have an idler roll having an idler roll seal which may help prevent contaminates from entering the bearing elements of the idler roll.

SUMMARY OF THE INVENTION

There is provided an idler roll for use in belt conveyor systems comprising a rotatable outer seal member disposed on at least one end of the idler roll, the outer seal member comprising at least one blade. There is also provided a seal assembly for use on an idler roll comprising a rotatable outer seal member, the outer seal member comprising a plurality of vanes. There is further provided a conveying system comprising a conveyor belt, and an idler roll, the idler roll comprising a rotatable outer seal member disposed on at least one end of the idler roll, the outer seal member having a plurality of blades, wherein the outer seal member is energized by the movement of the conveyor belt.

BRIEF DESCRIPTION OF THE DRAWINGS

FIG. 1 is a partial cross-sectional view of one end of an idler roll in accordance with the present invention as well as a conveyor belt disposed upon the idler roll.

FIGS. 2A is an end view of the seal assembly of the present invention and the shaft and is partially broken away to show the internal components of the seal assembly. FIG. 2B is a partial side view of the seal assembly and also shows the bearing assembly, and portions of an alternate embodiment of the center tube.

FIG. 3A is an end view of the adjusting nut. FIG. 3B is a cross-sectional view of the adjusting nut taken along the lines of I—I of FIG. 3A.

FIG. 4A is an end view of the outer seal member. FIG. 4B is a cross-sectional view of the outer seal member taken along the lines II—II of FIG. 4A. FIG. 4C is a detailed view of a vane taken along section III of FIG. 4B. FIG. 4D is a cross-sectional view of the vane of FIG. 4C taken along the lines IV—IV.

FIG. 5A is an end view of the contact member. FIG. 5B is a cross-sectional view of the contact member of FIG. 5A.

FIG. 6A is an end view of the inner seal member. FIG. 6B is a cross-sectional view of the inner seal member taken along the lines E—E of FIG. 6A.

FIG. 7 is an alternate embodiment of the adjusting nut.

DESCRIPTION OF THE PREFERRED EMBODIMENTS

Referring to FIGS. 1 and 2, there is shown an idler roll 10 and conveying system in accordance with the present invention. Idler roll 10 comprises a seal assembly 11 which may comprise an adjusting nut or securing assembly 12, an outer seal member 14, and a contact member or washer 16. The seal assembly 11 may further comprise an inner seal member 18. Preferably, the seal assembly 11 is disposed at both ends of the idler roll 10.

Idler roll 10 further comprises a shaft 20, a bearing assembly 22, a center tube 24, an outer shell 26, and side walls 28 disposed at each end. However, as is known in the art, a deep drawn head may be used instead of employing a center tube 24. The bearing assembly may be, for example, a tapered or ball bearing as is standardly used in the industry. A conveyor belt 30 may be disposed upon the idler roll 10.

Referring also to FIGS. 3A and 3B there is shown an end and cross-sectional view, respectively of the adjusting nut 12. The adjusting nut 12 comprises a first ledge 39 having a step 40 which contacts the outer seal member 14. The adjusting nut 12 further comprises a second hedge 42 which contacts the contact member 16. The adjusting nut 12 is threaded 44 to receive the threads of the end of the shaft 20.

Where a typical three quarter inch diameter shaft 20 is employed, the adjusting nut 12 may be, for example, a hexagonal adjusting nut having a dimension 46 of 1.125 inches, a dimension 48 of one inch, a threading 44 of 0.750 -1 6UNF-2B in inches, and a length 50 of 1.125 inches. The ledge 42 may have a dimension of 0.453 inches. The dimension 54 from the edge of the nut protrusion 56 to the base of the nut may be 0.969 inches. The dimension 58 from the end of the threading to the base of the nut may be 0.625 inches. The hex length dimension 60 may be 0.281 inches. The diameter 62 between the inner surface 64 of the adjusting nut 12 may be 0.781 inches. The diameter 66 between the ledges 42 may be 1.000 inches. Further, the diameter 68 between the ledges 39 may be 1.125 inches journaled to the 1.125 hex flange. Chamfers 70 may be disposed at the base of the nut and may be 0.03 inch by 45 degree chamfers. The dimension 72 of the length of the chamfer 70 may be 0.04 inches.

Now referring to FIGS. 4A–4D, there is shown a detailed view of the outer seal member 14. The outer seal member 14 comprises a plurality of vanes or blades 80. In the illustrated embodiment, there are eight vanes 80 which may be spaced apart every forty five degrees. However, a larger or smaller number of vanes may be used to deflect particles away from the contact member 16. The vanes 80 are preferably equally spaced apart. The outer seal member 14 rotates about the adjusting nut 12. Preferably, there is just enough clearance to between the surfaces of the outer seal member 14 and the adjusting nut 12 to allow the outer seal member 14 to rotate with the shaft 20.

The outer seal member 14 further comprises a circular base region 82, a first circular protrusion 84 extending from one end of the circular base region 82, a first lip 86 extending radially inward from an opposing end of the circular base region 82, a second circular protrusion 88 disposed between the first circular protrusion 84 and the first lip 86, and a second lip 90 disposed radially inward from an opposing side of said second circular protrusion 88. Referring also to FIGS. 1 and 2, the lips 86 and 90 as well as the second circular protrusion 88 define a c-shaped cross section to help hold the contact member 16 in place. Further, the lip 86 defines a step 92 which cooperates with the step 40 of the adjusting nut 12 to help secure the outer seal member 14 in place.

The diameters 94 and 96 between the first lip 86 and second lip 90 may be, for example, 1.031 inches and 1.188 inches, respectively. The diameters 98 and 100 between the inner surface and outer surface of the protrusion 88 may be approximately 1.313 inches and 1.438 inches, respectfully. The diameters 102 and 104 between the inner surface and outer surface of the protrusion 84 may be approximately 1.671 inches and 1.825 inches, respectfully. Further, the diameter 106 between the interior sides of the blades 80 may be approximately 1.156 inches.

The dimension 108 between the top of the blade 80 and the end of the protrusion 84 as measured along the longitudinal axis 109 may be 0.777 inches. The dimension 110 between the edge of the blade 80 and the end of the protrusion 84 as measured along the longitudinal axis 109 may be 0.688 inches. The length 112 of the protrusion 84 may be 0.633 inches. The dimensions 114 and 116 between each side of the lip 92 and the end of the protrusion 84 as measured along the longitudinal axis 109 may be 0.570 inches and 0.508 inches, respectfully. The dimensions 118 and 120 between each side of the lip 90 and the end of the protrusion 84 as measured along the longitudinal axis 109 may be 0.258 inches and 0.195 inches, respectfully. Preferably a chamfer 122 is disposed on the end of the protrusion 84. The chamfer 122 may, for example, have a length 124 of 0.047 inches and be at an angle 126 of fifteen degrees. Further, preferably surface 128 of the protrusion 84 has a two degree slope upward and surface 130 of protrusion 88 has a two degree slope downward as measured from the circular base region 82.

The vanes 80 may each angle out by thirty degrees as shown by angle 136. The dimension 138, representing the length of the vane at the circumferential ends of the outer seal member 14, may be 0.063 inches. The top surface 132 of the vane 80 is preferably at an angle 134 of fifteen degrees. The length 140, representing the horizontal length from one end of the outer seal member 14 to the vortex 141 of angle 134 may be 0.932 inches.

Referring specifically to FIGS. 4C and 4D, the portion of the blade 80 at the outer end (i.e., portion closest to the center tube 24) of the outer seal member 14 may have an angle 142 of 59.44 degrees and may have a height 144 of 0.055 inches. Further, the portion of the blade 80 at the inner end (i.e., portion closest to the shaft 20) of the outer seal member 14 may have an angle 146 of 81.65 degrees and may have a height 148 of 0.144 inches. The length of the blade 150 may be 0.334 inches.

Referring now to FIG. 5, there is shown an enlarged detail of the contact member or washer 16 of the present invention. The contact member 16 provides a shield to help prevent contaminates from reaching the bearing assembly 22.

Preferably, the contact member 16 is a felt contact member, such as a Number 8234 felt manufactured by the Felters Co. of Roebuck, S.C. Where such a felt contact member 16 is used, the outer and inner diameters 160 and 162 may, for example be 1.313 and 0.995 inches, respectfully. Further, the width 164 of the felt contact member 16 may be 0.250 inches. In addition, the adjusting nut 12, outer seal member 14, and inner seal member 18 may be formed of steel having zinc plating as is standardly done in the industry to prevent corrosion resistance, polyurethane, rubber, stainless steel, acetyl plastic, or any other appropriate material.

Referring now to FIG. 6, there is shown an enlarged detail of the inner or back seal member 18. In a preferred embodiment, the inner seal member 18 is included as an optional feature although its use is not required. The inner seal member 18 helps retain any grease next to the bearing cavity 168.

The inner seal member 18 is preferably a curved-shaped ring having first and second generally straight portions 170 and 172 and a curved portion 174 in between the straight portions 170 and 172. The inner seal member 18 may be disposed around the shaft 20. Further, the first generally straight portion 170 may be lodged against the center tube 24 as best shown in FIG. 1.

The region 176 of the center tube 24 in the vacinity of the first generally straight portion 170 may be slightly indented towards the shaft and thus may partially rest upon the first generally straight portion 170 to help secure the inner seal member 18 in place as shown in FIG. 1. Alternatively, a shoulder 179 may be used to help secure the inner seal member 18 in place as shown in FIG. 2B. Further, the center tube 24 may have an additional step 177 in a region above where the inner seal member 14 ends as shown in FIG. 1. The indentations or steps 176 and 177 may allow for ease of manufacturing of the center tube 24.

The inner seal member 18 may, for example, have an outer diameter 178 and an inner diameter 180 of 1.757 inches and 0.801 inches, respectfully. The inner seal member 18 may have a thickness 182 of 0.062 inches and a total width 184 of 0.312 inches. The first generally straight portion 170 may have a vertical height 186 of 0.139 inches and may be at an angle 188 of twenty five degrees. The curved portion 174 may have a radius of curvature of 0.062 inches. Further, a chamfer 190 may be disposed at the ends of the inner seal member 18 to help secure the inner seal member 18. The chamfer may be 0.015 inches by forty five degrees.

Referring now to FIG. 7, there is shown an alternate embodiment of the adjusting nut 12. The adjusting nut is similar to the adjusting nut shown in FIG. 3 except that an additional ring 200 of different material than the remaining portion of the adjusting nut is provided. Preferably, the ring 200 is a step-shaped ring disposed in the region where the outer seal member 14 rotates about the adjusting nut 12. Preferably, the ring 200 is formed of polyurethane and the remainder of the adjusting nut is formed of steel having zinc plating thereon to prevent corrosion resistance, Each of the steps 202 and 204 may be, for example, 0.25 inches in length and 0.04 inches in thickness.

Referring back to FIG. 1, the seal assembly 11 and specifically the outer seal member 14 is energized by the normal forward movement of a conveyor belt 30 disposed above the idler roll 10. Rotation imparted to the idler roll 10 by the conveyor belt 30 causes the idler roll 10 and thus the outer seal member 14 to rotate. The vanes 80 of the outer seal member 14 tend to repel contaminates or other particles that could otherwise enter the outer seal member 14. As a result, particles may be prevented from reaching the bearing assembly 22 and thus premature failure of the bearing assembly 22 may be prevented.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. An idler roll for use in belt conveyer systems comprising:

a rotatable outer seal member disposed on at least one end of said idler roll, said outer seal member comprising at least one blade, said at least one blade being disposed on an exterior of said outer seal member;

wherein said at least one blade repels particles.

2. The invention of claim 1 wherein said outer seal member comprises a plurality of said blades, said blades being equally spaced from one another.

3. The invention of claim 1 further comprising a contact member disposed between said outer seal member and a shaft in said idler roll.

4. The invention of claim 3 further comprising a bearing assembly and a securing assembly, said outer seal member disposed between one side of said bearing assembly and said securing assembly.

5. The invention of claim 4 wherein said securing assembly is an adjustable nut having a ring of polyurethane in a region where the outer seal member rotates about the adjusting nut.

6. The invention of claim 4 further comprising an inner seal member disposed on an opposing side of said bearing assembly for retaining grease in a bearing cavity.

7. The invention of claim 4 wherein said outer seal member comprises a circular base region, a first circular protrusion extending from one end of the circular base region, a first lip extending radially inward from an opposing end of the circular base region, a second circular protrusion disposed between the first circular protrusion and the first lip, and a second lip disposed radially inward from an opposing side of said second circular protrusion.

8. The invention of claim 7 wherein said first and second lips and said second circular protrusion define a c-shaped cross section to help hold said contact member in place.

9. A seal assembly for use on an idler roll comprising:

a rotatable outer seal member, said outer seal member comprising a plurality of vanes, said plurality of vanes being disposed on an exterior of said outer seal member;

wherein said plurality of vanes repels particles.

10. The invention of claim 9 further comprising a contact member disposed between said outer seal member and a shaft in said idler roll.

11. The invention of claim 10 further comprising a bearing assembly and an adjusting nut, said outer seal member disposed between one side of said bearing assembly and said adjusting nut.

12. The invention of claim 11 wherein said adjustable nut has a ring of polyurethane in a region where the outer seal member rotates about the adjusting nut.

13. The invention of claim 11 further comprising an inner seal member disposed on an opposing side of said bearing assembly for retaining grease in a bearing cavity.

14. A conveying system comprising:

a conveyor belt; and an idler roll, said idler roll comprising a rotatable outer seal member disposed on at least one end of said idler roll, said outer seal member having a plurality of blades;

wherein said outer seal member is energized by the movement of said conveyor belt and wherein said blades repel particles.

15. The invention of claim 14 further comprising a contact member disposed between said outer seal member and a shaft in said idler roll.

16. The invention of claim 15 further comprising a bearing assembly and a securing assembly, said outer seal member disposed between one side of said bearing assembly and said securing assembly.

* * * * *